Patented Apr. 19, 1949

2,467,712

UNITED STATES PATENT OFFICE 2,467,712

PREPARATION OF AMMELINE

Henry A. Walter, Longmeadow, Mass., assignor to Monsanto Chemical Company, St. Louis, Mo., a corporation of Delaware No Drawing. Application January 15, 1946, Serial No. 641,414

2 Claims. (Cl. 260—249.5)

This invention relates to a process for the preparation of ammeline. More particularly, the invention relates to a process for the prevention of the decomposition of ammeline during precipitation or purification procedures.

The preparation of ammeline by the reaction between alkali, alkaline earth, or ammonium cyanates and dicyandiamide is well known. The ammeline is recovered from the reaction products by means of acetic or other organic acids. However, the yields obtained by this process have been disappointingly low and a large amount of undesired ammelide is obtained, apparently due to decomposition of ammeline in the presence of the acids.

It is an object of this invention to produce ammeline in large yields from dicyandiamide and an alkali, alkaline earth or ammonium cyanate.

A further object is to suppress the formation of ammelide during the recovery of ammeline from the products of the reaction between alkali, alkaline earth and ammonium cyanates and dicyandiamide.

These and other objects are attained by precipitating ammeline from a hot aqueous solution of the products resulting from the reaction between alkali, alkaline earth or ammonium cyanates and dicyandiamide by passing carbon dioxide through the solution.

The following example is given in illustration and is not intended to limit the scope of this invention. Where parts are mentioned, they are parts by weight.

Example

A mixture of 133 parts of dicyandiamide and 109 parts of potassium cyanate was triturated and dried at 110° C. The dried mixture was then heated at 200° C. to 205° C. for 20 minutes during which time the mixture fused. The reaction product was dissolved in water at 90° C. to 100° C. and precipitated from the hot solution by bubbling carbon dioxide through the solution. 65 parts of ammeline were obtained. Substantially no ammelide was produced during the reaction. The ammeline was purified by recrystallization from aqueous sodium carbonate.

The potassium cyanate may be replaced by other alkali metal cyanates, such as lithium, sodium cyanates, etc., by alkaline earth metal cyanates such as barium, calcium or strontium cyanates, etc., or by ammonium cyanate.

The amount of carbon dioxide used may be varied widely. However, optimum results are obtained by adding carbon dioxide only until no more ammeline is precipitated and then recrystallizing the ammeline immediately from an aqueous solution of a salt of a strong base and a weak acid such as sodium carbonate, potassium carbonate, etc.

The use of carbon dioxide as a precipitating agent for ammeline suppresses the decomposition of ammeline into ammelide and provides a substantially pure product from the primary reaction.

It is obvious that many modifications and variations in the processes and compositions described above may be made without departing from the spirit and scope of this invention as defined in the appended claims.

What is claimed is:

1. A method for the production of ammeline which comprises reacting dicyandiamide with a member of the group consisting of alkali metal, alkaline earth metal and ammonium cyanates, dissolving the reaction product in water at about 100° C. and precipitating the ammeline from the solution with carbon dioxide whereby the production of ammelide is suppressed.

2. A method for the production of ammeline which comprises reacting potassium cyanate with dicyandiamide, dissolving the reaction product in water at about 100° C. and precipitating ammeline from the hot aqueous solution by passing carbon dioxide through said solution whereby the production of ammelide is suppressed.

HENRY A. WALTER.

REFERENCES CITED

The following references are of record in the file of this patent:

Beilstein: vol. 26, 4th ed., pp. 243–245.
Karrer: Organic Chemistry, p. 212 (1938).
Annalen de Chem., p. 165, vol. 376.